United States Patent [19] [11] Patent Number: 5,001,220
Köhler et al. [45] Date of Patent: Mar. 19, 1991

[54] PYRAZOLONE SUBSTITUTED COPOLYARYLENE SULFIDE

[75] Inventors: Karl-Heinz Köhler, Krefeld; Klaus Reinking, Wermelskirchen, both of Fed. Rep. of Germany

[73] Assignee: Bayer AG, Leverkusen, Fed. Rep. of Germany

[21] Appl. No.: 318,647

[22] Filed: Mar. 3, 1989

[30] Foreign Application Priority Data

Mar. 15, 1988 [DE] Fed. Rep. of Germany ....... 3808496

[51] Int. Cl.$^5$ ...................... C08G 75/16; C08G 83/00
[52] U.S. Cl. ................................... 528/367; 528/368; 528/388
[58] Field of Search ....................... 528/367, 368, 388

[56] References Cited

U.S. PATENT DOCUMENTS

| 3,354,129 | 11/1967 | Edmonds et al. |         |
|-----------|---------|----------------|---------|
| 4,350,810 | 9/1982  | Tieszen et al. |         |
| 4,760,128 | 7/1988  | Ebert et al.   | 528/388 |
| 4,824,933 | 4/1989  | Ostlinning et al. | 528/388 |

Primary Examiner—Harold D. Anderson
Attorney, Agent, or Firm—Connolly and Hutz

[57] ABSTRACT

This invention relates to new high molecular weight, optionally branched co-polyarylene sulphides prepared by the reaction of halogenated aromatic compounds and dihalogenated phenyl-pyrazole-3-ones in a polar solvent with the addition of 0.2 to 100 mol %, based on the dihalogenated aromatic compound, of an amino acid to the reaction mixture, and to the use of these copolyarylene sulphides as embedding compounds for electronic parts.

8 Claims, No Drawings

PYRAZOLONE SUBSTITUTED COPOLYARYLENE SULFIDE

This invention relates to new high molecular weight, optionally branched co-polyarylene sulfides prepared by the reaction of halogenated aromatic compounds and dihalogenated phenyl-pyrazole-3-ones with sulphur donors in a polar solvent with the addition of from 0.2 to 100 mol %, based on the dihalogenated aromatic compounds, of an amino acid to the reaction mixture, and to the use of the new co-polyarylene sulfides as embedding compounds for electronic parts.

Co-polyarylene sulfides and methods of their preparation are known (e.g. U.S. Pat. No. 3,354,129). In contrast to known polyarylene sulfides such as polyphenylene sulfide, these co-polyarylene sulfides have a reduced rate of crystallization.

For certain purposes, e.g. for the production of electronic parts, the material employed is required to crystallize sufficiently slowly so that the melting point of the material is not substantially reduced compared with a pure polyarylene sulfide. The speed of crystallization of polyarylene sulfides decreases with increasing molecular weight but the purposes for which they are intended require readily fluid products.

It has now been found that co-polyarylene sulfides, optionally branched, prepared by the reaction of dihalogenated aromatic compounds and dihalogenated phenyl-pyrazolon-3-ones with sulphur donors have a sufficiently low speed of crystallization. Their melting point and degree of crystallization are only slightly lower than those of polyarylene sulfide.

This invention therefore relates to co-polyarylene sulfides, preferably co-polyphenylene sulfides, consisting to an extent of from 99.5 to 90 mol %, based on the copolymers, of recurrent units corresponding to Formula (I)

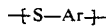  (I)

wherein

Ar stands for $C_6$ to $C_{24}$ arylene, preferably phenylene, and from 0.5 to 10 mol %, based on the copolymer, of recurrent units corresponding to Formula (II)

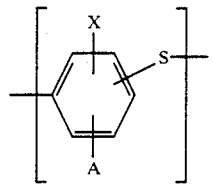  (II)

wherein

A stands for a substituted pyrazol -3-one group and X stands for H or $SO_3H$ and optionally up to 5 mol %, preferably from 0.1 to 2.5 mol %, based on the sum of the units of formulae (I) and (II), of recurrent units of Formula (III)

  (III)

wherein

Ar stands for an aromatic group containing 6 to 30 carbon atoms and n stands for the number 3 or 4, in which the structural units of formulae (I), (II) and optionally (III) may be predominantly in random distribution in the copolymer.

In Formula (II), A stands for a substituted pyrazol -3-one group which may be represented by the tautomeric formulae (IIa), (IIb) and (IIc):

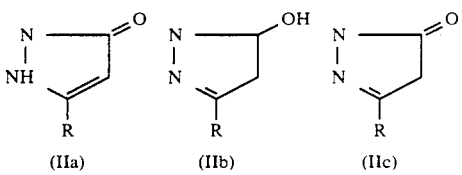

wherein the 4-position nitrogen is the point of attachment to the phenyl nucleus in Formula (II) and wherein R stands for $C_1$ to $C_7$ alkyl or $C_6$ to $C_{10}$ aryl and in Formula (II) the sulphur S and the pyrazolone nitrogen N may be in the ortho, meta or para-position to one another on the phenyl nucleus.

The invention further relates to a process for the preparation of the optionally branched co-polyarylene sulfides according to the invention, preferably copolyphenylene sulfides, characterized in that halogenated aromatic compounds corresponding to Formula (Ia)

  (Ia)

wherein stands for halogens such as Cl and Br in the meta and/or para position to one another and Ar stands for $C_6$ to $C_{24}$ arylene, preferably (a) from 50 to 100 mol % of dihalogenated aromatic compounds corresponding to the following formula

  (IV)

and from 0 to 50 mol % of dihalogenated aromatic compounds corresponding to the following formula

  (V)

in which

X stands for halogens such as chlorine or bromine in the meta or para position to one another and $R^1$ which may be identical or different, may denote hydrogen, $C_1$ to $C_4$ alkyl, $C_5$ to $C_{10}$ cycloalkyl, $C_6$ to $C_{10}$ aryl, $C_7$ to $C_{10}$ alkylaryl or $C_7$ to $C_{14}$ arylalkyl and two groups $R^1$ in the ortho position to one another may be linked together to form an aromatic or heterocylic ring containing up to 3 hetero atoms such as N, O or S one of the groups $R^1$ is in all cases different from hydrogen and (b) from 0 to 5 mol %, preferably from 0.1 to 2.5 mol %, based on the sum of the dihalogenated aromatic compounds corresponding to formulae (IV) and (V), of a trior tetrahalogenated aromatic compound corresponding to the following Formula $$ArX_n \qquad (VI)$$

wherein

Ar denotes an aromatic $C_6$ to $C_{14}$ ring or a heterocyclic group with 5 to 4 ring atoms in which up to three ring carbon atoms may be replaced by hetero atoms such as N, 0 or S, X stands for halogen such as chlorine or bromine and n stands for the number 3 or 4, and (c) alkali metal sulfides, preferably sodium or potassium sulfide or mixtures thereof, preferably in the form of their hydrates or aqueous mixtures, optionally together with small quantities of alkali metal hydroxides such as sodium or potassium hydroxide, in which the molar ratio of (a+b) : c may be in the range of from 0.75:1 to 1 25:1, (d) optionally in the presence of catalysts such as alkali metal carboxylates, alkali metal phenolates, alkali metal phosphonates, alkali metal fluorides, alkali metal alkyl sulphonates or N,N-dialkyl carboxylic acid amides, from 0.2 to 50 mol %, preferably from 0.2 to 25 mol %, based on the mols of dihalogenated aromatic compounds, of an amino acid being added to the reaction mixture, and (e) from 0.5 to 10 mol %, based on the sum of the components corresponding to Formulae (IV), (V) and (VI), of dihalogenated phenyl pyrazol -3-ones corresponding to Formula (VII)

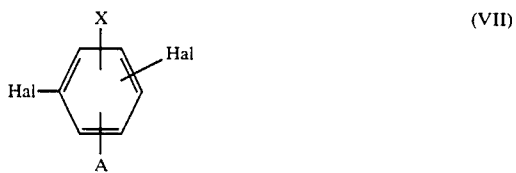

(VII)

wherein

A stands for a pyrazole-3-one group corresponding to Formula (II),

X stands for hydrogen (H) or $SO_3H$ and

Hal stands for a halogen such as chlorine or bromine are reacted together.

The reaction time may be up to 24 hours and is preferably from 2 to 18 hours. The reaction temperatures are from 150° to 280° C.

The reaction may be carried out by various methods. The alkali metal sulfides are preferably put into the process in the form of their hydrates and aqueous mixtures or aqueous solutions. For the reaction, they are partially or, preferably, completely dehydrated. The water present in the reaction mixture is distilled from the mixture.

The water of distillation may be removed directly or by means of azeotropic formers, preferably the dihalogenated aromatic compounds. For the process of dehydration, all the components of the reaction mixture may be mixed together and the whole reaction mixture may then be dehydrated but the components for the reaction may also be added in any other sequence before and after dehydration.

The components for the reaction are preferably brought together continuously together with amino acids in the presence of the polar solvent with simultaneous removal of the water. When this procedure is employed, any reaction which sets in can be controlled by the rate at which the components are introduced. It is thereby possible to avoid prolonged residence times of the water.

If complete dehydration is carried out, the reaction may be carried out pressure free or at a low pressure of up to about 3 bar. For obtaining elevated reaction temperatures above the boiling point of the solvent or of the mixture of solvents and di- and poly-halogenated aromatic compounds, elevated pressures of up to 50 bar may be employed.

The comonomer may be added at any stage of the reaction, preferably at the end of the phase of dehydration.

Working up of the reaction mixture and isolation of the copolyarylene sulfides may be carried out in known manner.

The co-polyarylene sulfides may be separated from the reaction solution by usual methods such as filtration or centrifuging, either directly or, for example, after the addition of water and/or dilute acids or organic solvents which have a low solubility for polyarylene sulfides. After the product has been separated, it is generally washed with water. It may also be washed or extracted with other washing liquids used either together with the wash water or subsequently.

The co-polyarylene sulfide may also be obtained, for example, by removal of the solvent by distillation followed by washing, as described above.

The alkali metal sulfides may also be obtained, for example, from $H_2S$ and the alkali metal hydroxides or from hydrogen sulfides and alkali metal hydroxides.

Certain proportions of alkali metal hydroxide may also be added, depending on the proportion of alkali metal hydrogen sulfide present as impurity of the alkali metal sulfide in the reaction solution. Compounds which form alkali metal hydroxides or split off alkali metal hydroxides under the reaction conditions may be used instead of the alkali metal hydroxides.

If branched co-polyarylene sulfides are to be produced, at least 0.05 mol % of a tri- or tetrahalogenated aromatic compound of Formula (VI) should be used.

The following are examples of dihalogenated aromatic compounds of Formula (IV) to be used according to the invention: p-dichlorobenzene, p-dibromobenzene, 1-chloro-4-bromobenzene, and 1-chloro-3-bromobenzene. They may be used separately or as mixtures. 1,4-dichlorobenzene and/or 1,4-dibromobenzene are particularly preferred.

The following are examples of dihalogenated aromatic compounds of Formula (V) to be used according to the invention: 2,5-dichlorotoluene, 2,5-dichloroxylene, 1-ethyl-2,5-dichlorobenzene, 1-ethyl-2,5-dibromobenzene, 1-ethyl-2- bromo-5-chlorobenzene, 1,2,4,5-tetramethyl-3,5-dichlorobenzene, 1-cyclohexyl-2,5-dichlorobenzene, 1-phenyl-2,5-dichlorobenzene, 1-benzyl-2,4-dichlorobenzene, 1-phenyl-2,5-dibromobenzene, 1-p-tolyl-2,5-dichlorobenzene, 1-p- tolyl-2,5-dibromobenzene, 1-hexyl-2,5-dichlorobenzene, 2,4dichlorotoluene, 2,4-dichloroxylene, 2,4-dibromocumene and 1-cyclohexyl-3,5-dichlorobenzene. These may be used separately or as mixtures.

The following are examples of tri- and tetrabalogenated aromatic compounds of Formula (VI) to be used according to the invention: 1,2,3-trichlorobenzene, 1,2,4-trichlorobenzene, 1,2,4-tribromobenzene, 1,3,5-trichloro-2,4,6.trimethylbenzene, 1,2,3-trichloronaphthalene, 1,2,4-trichloronaphthalene, 1,2,6-trichloronaphthalene, 2,3,4-trichlorotoluene, 2,3,6-trichlorotoluene, 1,2,3,4-tetrachloronaphthalene, 1,2,4,5-tetrachlorobenzene, 2,2'-4,4'-tetrachlorobiphenyl and 1,3,5-trichlorotriazine.

The following are examples of pyrazolones of Formula (VII): 2-(2',5'-dichlorophenyl)-2,4-dihydro-5-methyl-3H-pyrazol-3-one; 2-(2',5'-dichloro-4-sulphophenyl)-2,4-dihydro-5-methyl-3H-pyrazole-3-one; 2-(2',5'-dichlorophenyl)-2,4-dihydro-5-phenyl-3H-pyrazole-3-one; 2-(2',5'-dichloro-4-sulphophenyl)-2,4-dihydro-5-phenyl-3H-pyrazol -3-one.

Any polar solvent which ensures sufficient solubility of the organic and optionally inorganic reactants under the reaction conditions may generally be used for the reaction. N-alkyl lactams are preferred.

The N-alkyl lactams are lactams of amino acids containing 3 to 11 carbon atoms and optionally carrying substituents on the carbon structure which are inert under the reaction conditions.

The following are examples of N-alkyl lactams which may be used: N-methyl caprolactam, N-ethyl caprolactam, N-isopropyl caprolactam, N-isobutyl caprolactam, N-propyl caprolactam, N-butyl caprolactam, N-cyclohexyl caprolactam, N-methyl-2-pyrrolidone, N-ethyl-2-pyrrolidone, N-isopropyl-2-pyrrolidone, N-isobutyl-2-pyrrolidone, N-propyl-2-pyrrolidone, N-butyl-2-pyrrolidone, N-cyclohexyl-2-pyrrolidone, N-methyl-3-methyl-2-pyrrolidone, N-cyclohexyl-2-pyrrolidone, N-methyl-3-methyl-2-pyrrolidone, N-methyl-3,4,5-trimethyl-2-pyrrolidone, N-methyl-2-piperidone, N-ethyl-2-piperidone, N-isobutyl-2piperidone, N-methyl-6-methyl-2-piperidone and N-methyl-3-ethyl-2-piperidone.

Mixtures of the above mentioned solvents may be selected.

The amino acids used are preferably open chain or cyclic aliphatic $C_1$ to $C_{20}$ amino acids which may contain side chain groups such as $C_1$ to $C_4$ alkyl, $C_6$ to $C_{14}$ aryl or combinations thereof, $C_1$ to $C_4$ alkoxy-thio-$C_1$ to $C_4$-alkyl groups or a heterocyclic $C_6$ to $C_{14}$ group containing up to three hetero atoms such as N, 0 or S. The amino group may be present as $NH_2$, NRH or $NR_2$, where R may be any alkyl group, preferably a $C_1$ to $C_4$ alkyl group. Two groups denoted by R may also form the two ends of an alkylene chain containing carboxyl side groups which form a ring together with the NH group.

The amino group may be fixed in the α-, β-, γ- or ω-position. Diamino acids or amino dicarboxylic acids may also be used.

The following are examples of suitable amino acids:
glycine, α-alanine, β-alanine (α- and β-aminopropionic acid), α-aminobutyric acid, γ-aminobutyric acid, α-aminoisovaleric acid (valine), γ-amino-isocaproic acid (leucine), ε-aminocaproic acid, 11-aminoundecanoic acid, N-methylamino acetic acid (sarcosine), N-methyl-α-aminopropionic acid, N-methyl-β-aminopropionic acid, N-methyl-γ-aminobutyric acid, N-methyl-ε-aminocaproic acid, N-methyl-11-aminoundecanoic acid, aminobutane diacid (aspartic acid), 2-aminopentane diacid (glutamic acid), 2-amino-4-methylthiobutanoic acid (methionine), phenylalanine and proline.

The reaction may in addition be carried out in the presence of conventional catalysts such as, for example:

Alkali metal carboxylates (DE-AS 24 53 749), lithium halides or alkali metal carboxylates (DE-OS 26 23 362), lithium chloride or lithium carboxylate (DE-OS 26 23 363), alkali metal carbonates in combination with alkali metal carboxylates (U.S. Pat. No. 4,038,259), lithium acetate (DE-OS 26 23 333), trialkali metal phosphates (DE-OS 29 30 710), trialkali metal phosphonates (DE-OS 20 30 797), alkali metal fluorides (DE-OS 30 19 732), alkali metal sulphonates (U.S. Pat. No. 4,038,260), lithium carbonate and lithium borate (U.S. Pat. No. 4,030,518).

The co-polyarylene sulfides according to the invention may be mixed with other polymers, with pigments and with fillers such as, for example, graphite, metal powders, glass powder, powdered quartz, glass fibers or carbon fibers or they may be used together with conventional additives for polyarylene sulfides such as stabilizers or mold release agents.

The melt flow of polyarylene sulfides is generally determined according to ASTM 1238-70 at 316° C., using a 5 kg weight, and given in terms of g/10 min..

If the melt flow values are high, however, this measurement may give rise to difficulties owing to the high outflow rate of the polymer melt.

For this reason, the fusion viscosity ηm of the polymer melt (in pa.s) has been determined at 306° C. in dependence upon the shear stress (in Pa), using an Instron Rotation Viscosimeter.

This enables the fusion viscosity to be determined over a very wide range of from $10^{-1}$ to $10^{-7}$ Pa.s. In the Instron Rheometer, the polymer is melted between a fixed plate and a rotatable cone and the torque of the cone is determined. The fusion viscosity in dependence upon the shear stress can be calculated from the torque, the angular velocity and the data of the apparatus. A Rheometer Model 3250 of Instron was employed. The diameter of the cone and of the plate was 2 cm. The fusion viscosity was given as the value obtained at a shear stress of $\tau = 10^2$ Pa.

Immediately after isolation from the reaction mixture, the co-polyarylene sulfides according to the invention generally have fusion viscosities of from $0.3 \times 10^3$ to $5 \times 10^6$ Pa.s, preferably from $1.5 \times 10^3$ to $10^4$ Pa.s, and they have good color properties.

Crystallization of the copolyarylene sulfides is determined by Differential Scanning Colorimetry (DSC) using a DSC 2 apparatus of Perkin-Elmer. The samples put into the test weighed 8 to 11 mg and the heating and cooling rates were 20 deg. cent. per minute. The sample is kept in the molten state for at least 1 to 2 minutes after it has first been heated up and it is then cooled and again heated until it melts. The data obtained are the crystallization temperature $T_k$ (° C.) and the enthalpy $_\Delta J_k$ (J/g), the melting temperature $T_M$ (° C.) and $_\Delta H_M$ (J/g). The copolyarylene sulfides according to the invention which crystallize slowly are distinguished by the fact that $_\Delta T = T_M - T_K$ is greater than or equal to 50° C. and less than 80° C.

They may be worked up directly into sheet products, molded articles or fibers by extrusion, extrusion blowing, injection molding or other conventional processing techniques. These products may be used for the production of molded structures e.g. preferably as covering and embedding compounds for electronic parts, chemically resistant and weathering resistant parts and parts of apparatus such as pump housings and pump impellers, sealing rings, parts of office machinery and telecommunication equipment and domestic appliances, valves, parts of ball bearings, etc..

EXAMPLE 1

Co-PPS containing 2 mol% of 2',5'-phenylene-2,4-dihydro-2-(5-methyl)-pyrazolone-3 units.

2,700 g (2.67 l) of N-methyl caprolactam and 587.0 g (3 993 mol) of p-dichlorobenzene are introduced under nitrogen as protective gas into a 5 liter refined steel reactor equipped with paddle mixer, two dropping funnels, water separator and reflux condenser, and heated therein to 215° C. An aqueous solution prepared from 1147 5 g of $Na_2S3H_2O$ (8.94 mol), 325 g $H_2O$, 141.2 g (1.24 mol) of caprolactam and 4.3 g (0.107 mol) of NaOH is slowly added dropwise with stirring over a period of about 3.5 hours. At the same time, a further 648.1 g (4.40 mol) of p-dichlorobenzene are added over a period of 2.5 to 3 hours. After the water has been separated and sump temperature has briefly been lowered to about 170° C., 40.5 g (0.125 mol) of 2-(2',5'-dichlorophenyl)-2,4-dihydro-5-methylpyrazolone-3 are added to the reaction mixture in a stream of inert gas. The sump temperature is raised to about 230° C. in about 60 minutes. The reaction is terminated after a further 9 hours stirring. To terminate the reaction, the reaction mixture is precipitated by pouring onto a receiver containing isopropanol with stirring, acidified with $H_2SO_n$ and filtered. The filter cake, which is obtained in the form of a coarse white powder, is thoroughly washed with $H_2O$ and dried at 100° C. Yield: 794.5 g (85.9%).

The weight average molecular weight Mw is 31,000.

EXAMPLE 2

Co-PPS containing 3 mol% of 2',5'-phenylene-2,4-dihydro-2(5-methyl)-pyrazolone-5 units.

The method of preparation was analogous to that of Example 1 but a total of 1223 g (8.32 mol) of p-dichlorobenzene and 62.5 g (0.26 mol) of 2-(2',5'-dichlorophenyl)-2,4-dihydro-5-methylpyrazolone-3 was used. Mw: 23,000, yield: 780 g   84.3%.

EXAMPLE 3

Co-PPS containing 5 mol % of 2',5'-phenylene-2-(5-methyl)-pyrazolone-3 units.

Method of preparation analogous to that of Example 1 but using a total of 1162 g (7.90 mol) of p-dichlorobenzene and 101.1 g (0.435 mol) of 2-(2',5'-dichlorophenyl)-2,4-dichloro-5-methylpyrazolone-3. Mw: 21,000.

Comparison Example

PPS without comonomers.

Method of preparation analogous to that of Example 1 without the addition of comonomers but using a total of 1207 g (8.2mol) of p-dichlorobenzene. Mw: 43,600.

TABLE

Influence of the comonomer on the rate of crystallization of the Co-PPS

| Example | mol % comonomer | Mw | $\Delta T_K$(°C.) | $H_K$ (J/g) | $T_M$(°C.) |
|---|---|---|---|---|---|
| 1 | 2 | 31,000 | 229 | 48 | 282 |
| 2 | 3 | 23,000 | 216 | 49 | 277 |
| 3 | 5 | 21,000 | 207 | 46 | 277 |
| Comparison | — | 28,000 | 239 | 47 | 281 |

We claim:

1. Copolyarylene Sulfide consisting to an extent of from 99.5 to 90 mol %, based on the copolymer, of recurrent units corresponding to Formula (I)

$$\mathrm{{+}S{-}Ar{+}} \quad (I)$$

wherein

Ar represents $C_6$ to $C_{24}$ arylene, and from 0.5 to 10 mol %, based on the copolymer, of recurrent units corresponding to Formula (II)

(II) [structural formula showing phenyl ring with X and A substituents, connected to S]

wherein

A represents a substituted pyrazolone-3 group attached at the 4-position to the phenyl nucleus and X represents hydrogen (H) or $SO_3H$, the copolyarylene sulfide optionally additionally comprising up to 5 mol %, based on the sum of the units of Formulae (I) and (II), of units corresponding to Formula (III)

$$\mathrm{[\,Ar\,]\text{-}n} \quad (III)$$

wherein

Ar represents an aromatic group having 6 to 30 carbon atoms and n represents the number 3 or 4, in which the structural units corresponding to Formulae (I), (II) and optionally (III) and predominantly in random distribution in the copolymer.

2. Process for the preparation of an the optionally branched co-polyarylene sulfide, characterized in that
  (a) dihalogenated aromatic compounds corresponding to Formula (Ia)

$$\mathrm{X{-}{+}Ar{+}{-}X} \quad (Ia)$$

wherein

X represents halogens in the meta or para position to one another and

Ar represents $C_6$ to $C_{24}$ arylene, (b) from 0 to 5 mol % based on the sum of the dihalogenated aromatic compounds of Formulae (IV) and (V), of a tri- or tetrahalogenated aromatic compound corresponding to the following formula $$\mathrm{ArX_n} \quad (IV)$$

wherein

Ar represents an aromatic $C_6$ to $C_{14}$ ring or a heterocyclic group containing 5 to 14 ring atoms in which up to 3 ring carbon atoms are replaced by hetero atoms such as N, O or S, X represents halogen and n represents the number 3 or 4, and (c) alkali metal sulfides, in which the molar ratio of (a+b): is in the range of from 0.75:1 to 1 25:1, (d) optionally in the presence of catalysts selected from alkali metal carboxylates, alkali metal phosphates, alkali metal phosphonates, alkali metal fluorides, alkali metal alkyl sulphonates or N,N-dialkylcarboxylic acid amides, from 0.2 to 50 mol %, based on the number of mols of dihalogenated aromatic compounds, of an amino acid being added to the reaction mixture, and (e) from 0.5 to 10 mol %, based on the sum of the components corresponding to Formulae (IV), (V) and (VI), of dihalogenated phenyl pyrazol -3-ones corresponding to Formula (VII)

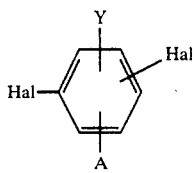
(VII)

wherein

A represents a pyrazole-3 group,

X represents hydrogen (H) or $SO_3H$ and

Hal represents a halogen such as chlorine or bromine are reacted together.

3. A molded article of the copolyarylene sulfide according to claim 1.

4. The copolyarylene sulfide of claim 1 wherein Ar represents phenylene.

5. The process of claim 2 wherein the amount of component (b) is 0.1 to 2.5 mol %.

6. The process of claim 2 wherein the alkali metal sulfides consist of sodium or potassium sulfide or mixtures thereof in the form of hydrates or aqueous mixtures.

7. The process of claim 6 additionally comprising a small quantity of alkali metal hydroxide.

8. The process of claim 2 wherein the amount of component (d) is 0.2 to 25 mol %.

* * * * *